Oct. 27, 1953  D. H. MONTGOMERY  2,656,753
TOOL-CARRIER STOP
Filed Aug. 1, 1947  4 Sheets-Sheet 1

Inventor
DONALD H. MONTGOMERY.
By Mitchell Bechert
Attorneys

Oct. 27, 1953  D. H. MONTGOMERY  2,656,753
TOOL-CARRIER STOP
Filed Aug. 1, 1947  4 Sheets-Sheet 2

Inventor
DONALD H. MONTGOMERY.
By Mitchell Bechert
Attorneys

Oct. 27, 1953  D. H. MONTGOMERY  2,656,753
TOOL-CARRIER STOP
Filed Aug. 1, 1947  4 Sheets-Sheet 3

Inventor
DONALD H. MONTGOMERY
By Mitchell Berhert
Attorneys

Oct. 27, 1953     D. H. MONTGOMERY     2,656,753
TOOL-CARRIER STOP
Filed Aug. 1, 1947     4 Sheets-Sheet 4
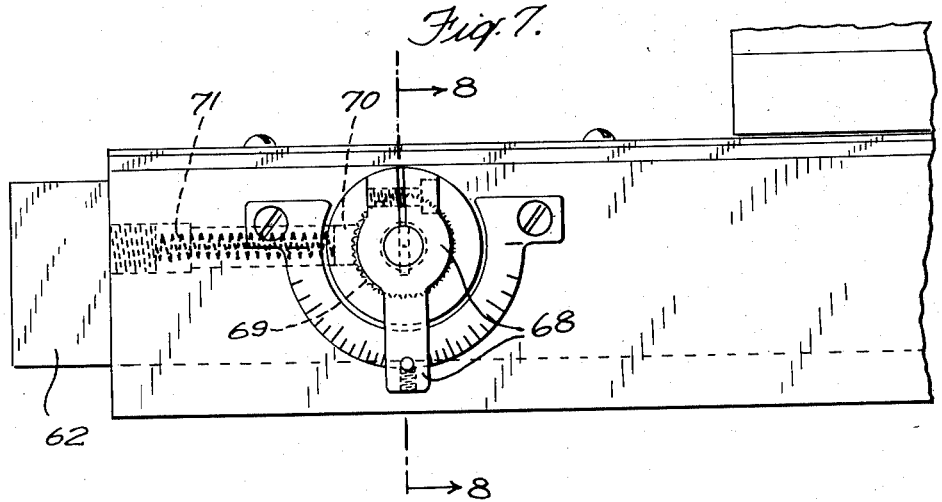
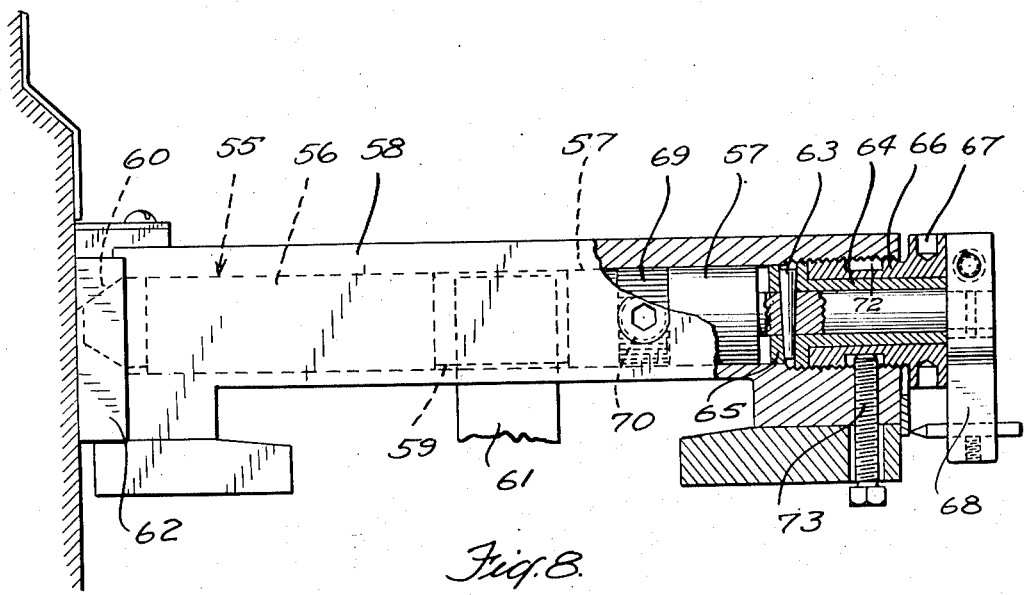
Inventor
DONALD H. MONTGOMERY.
Attorneys Patented Oct. 27, 1953

2,656,753

UNITED STATES PATENT OFFICE 2,656,753

TOOL-CARRIER STOP

Donald H. Montgomery, West Hartford, Conn., assignor to The New Britain Machine Company, New Britain, Conn., a corporation of Connecticut Application August 1, 1947, Serial No. 765,601

12 Claims. (Cl. 82—24)

My invention relates to automatic multiple-station machines, and in particular to a cross or forming slide and to a stop therefor.

In multiple-station automatic machines wherein tools and work are indexed relatively to each other, it is virtually impossible to assure that each tool will perform in exactly the same manner upon work successively presented thereto. In multiple-spindle machines wherein the work is supported in spindles on a spindle carrier, inaccuracies in the location of spindle axes may result in any one tool producing slightly different cuts upon successive pieces of work. To avoid this difficulty, particularly in the case of cross-slides, stops have been provided whereby the cross-slide may directly abut the spindle carrier and thus determine its own limiting feed position. Unfortunately, however, such construction has not proved to be a solution to the problem, in that chips and other extraneous material may in effect dislocate the homing abutment of the cross-slide, with possible harmful effects on the feed mechanism. Furthermore, as the machine heats up with use or is subjected to different temperature conditions, the expansion of the spindle carrier alone may be sufficient further to distort or to upset calibrated spindle locations—again with the result that any given tool may produce different cuts on successive pieces of work.

It is, accordingly, an object of my invention to provide an improved mechanism whereby the above-noted difficulties may be minimized.

It is another object to provide an improved cross-slide mechanism for cooperation with the spindles of a multiple-spindle machine so as to improve the uniformity of product produced by such a machine.

It is also an object to provide an improved cross-slide mechanism to cooperate uniformly with a given spindle, substantially independently of temperature.

It is still another object to provide an improved cross-slide mechanism which will produce substantially uniform cuts on successively indexed work, regardless of inaccuracies in the location of work-supporting parts.

It is still another object to provide improved means for determining a limiting position for a cross-slide feed mechanism, and for adjusting the position of the cross-slide independently of the feed-limiting mechanism for said cross-slide.

It is a more specific object to provide safety relief means for the above mechanism, whereby the effectiveness of such mechanisms in producing a uniform product may not be impaired.

It is also a specific object to provide improved feed-limiting means that will derive its feed-limiting functions in the vicinity of the work but which will nevertheless be substantially unaffected by the presence of chips or other extraneous material.

Other objects and various further features of the invention will be pointed out or will occur to those skilled in the art from a reading of the following specification in conjunction with the accompanying drawings. In said drawings:

Fig. 6 is an enlarged fragmentary view in partial section illustrating a cooperative engagement of parts shown in Fig. 1;

Fig. 7 is an enlarged side view of a modification according to the invention; and Fig. 8 is an end view of the structure of Fig. 7, partly sectionalized for the plane 8—8 of Fig. 7.

Figure 1:
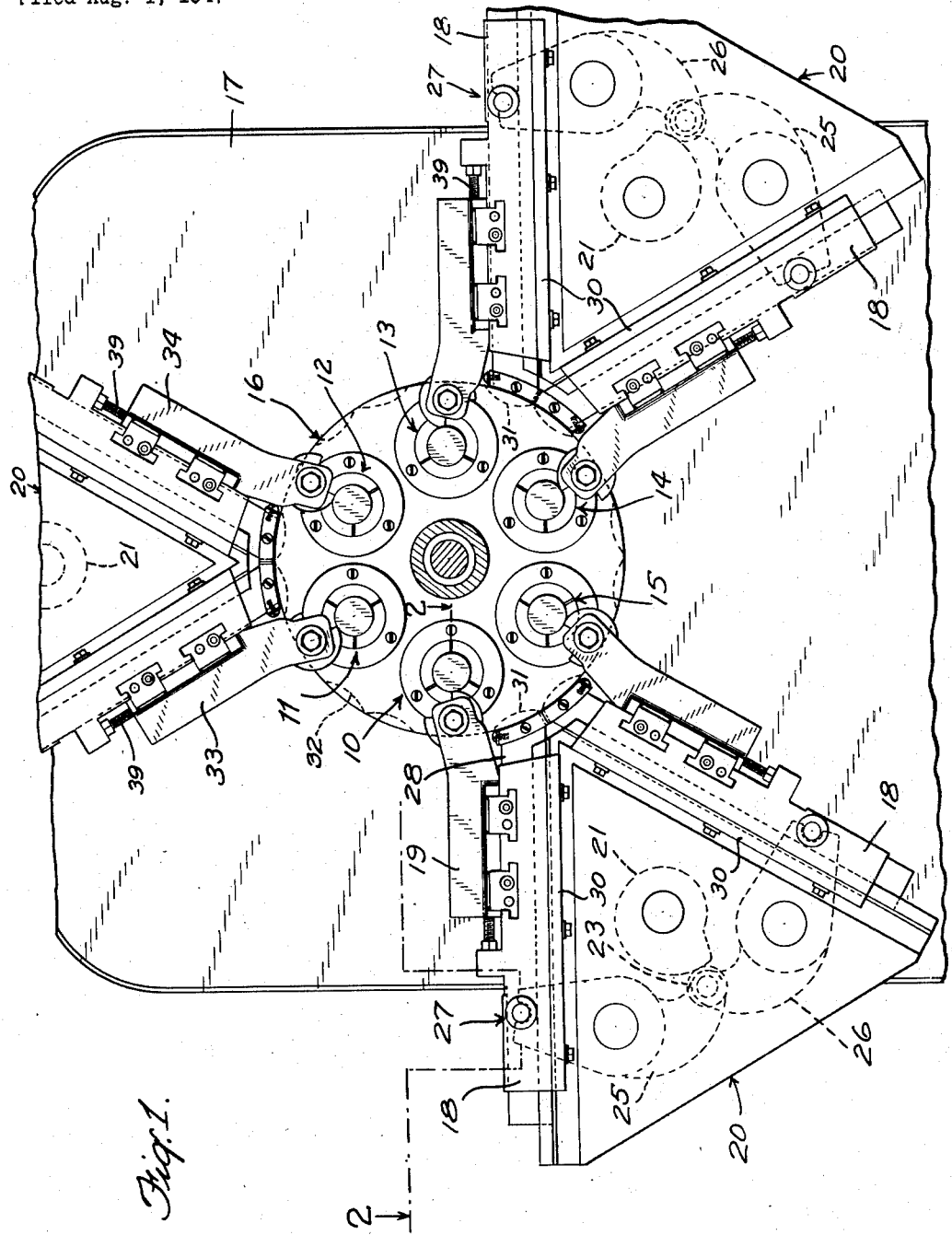
Fig. 1 is a front end view of a multiple-spindle machine incorporating features of the invention.

Briefly stated, my invention contemplates an improved mechanism for determining a number of limiting feed positions of, say, a cross-slide as employed in a multiple-spindle machine. The mechanism includes stop means abuttingly to engage the spindle carrier and thus to limit the feed of the cross-slide. Seal means in the abutment area may effectively exclude chips, and resilient means may constantly maintain the effectiveness of the seal means. Lost-motion elements of the feed-position limiting mechanism may be located away from the working area, so as to be unaffected by chips. In order to compensate for errors in the relative location of spindle axes, the parts of the spindle carrier which receive abutment by the stop means may be hardened and especially calibrated, as by grinding or honing. In order to compensate for growth of the spindle carrier with temperature, the spindle carrier and the stop means may be of materials having different temperature coefficients of expansion. In the specific form to be described, a calibrated limiting feed relationship for a particular cross-slide feed mechanism may be undisturbed by independent adjustment of the cross-slide with respect thereto, and novel safety-relief mechanisms prevent a destructive overstressing of parts.

Referring to the drawings, my invention is shown in application to a multiple-spindle machine having a plurality of spindles 10, 11, 12, 13, 14, 15 supported in equally spaced relation in a spindle carrier 16, which in turn is indexibly supported by the frame 17 of the machine. In the form shown, a plurality of tool slides 18 support the side-working or forming tool holders 19 for simultaneous cooperation with work held in the various spindles 10 through 15. The cross-slides 18 may be mounted in batteries of two, that is, in units 20 having ways to guide say the cross-slide 18 generally radially of the axis of spindle carrier 16. Each of the batteries 20 may support one or more slide-actuating cams 21—22 to be engaged by rollers 23—24 of feed rocker arms 25—26. Each of the feeding arms 25—26 may engage a transversely extending pin 27 in the cross-slide 18 for imparting feeding motion to the tool carried by the tool holder 19.

Although the three cross-slide batteries 20 are shown supporting similar tools for generally similar forming operations, it will be understood that in many applications it may not be desirable to employ similar tools or cross-slides for all stations. The invention need be described, however, only in connection with one of the cross-slides shown.

In accordance with a feature of the invention, calibrated sealed stop means may limit the feed of the cross-slide 18, and this stop means may cooperate directly with the side or with the outer periphery of the spindle carrier 16. In the form shown, the stop means includes a stop member 28 slidable between the frame 17 and the cross-slide 18 in ways or guides which may be defined by a shoulder 29 in the cross-slide 18 and by an extended dovetail member 30 forming part of the guiding mechanism for the cross-slide 18. The stop member 28 is preferably slidable generally radially of the spindle carrier, in the same sense as the sliding action of the cross-slide 18 which that stop member 28 serves. In the form shown, the stop member 28 extends into direct engagement at one end with the spindle carrier 16, and the abutment pin 27 also engages the stop member 28. It will be clear that when the stop member 28 is forced by pin 27 into strong abutment with the spindle carrier 16, further actuation by the feed rocker arm 25 may be ineffective further to advance the tool supported by the tool holder 19. A limiting feed position is thus determined.

As indicated generally above, I prefer to protect the spindle carrier 16 against peening or other harmful effects resulting from repeated overstressing abutments, as produced by stop member 28. Those areas on the spindle carrier 16 which receive such abutments may be reinforced by suitable inserts or plugs of hardened material, or, as in the preferred form shown, the periphery of the spindle carrier 16 may be suitably heat treated in the abutment areas to withstand repeated abutment. These hardened areas are schematically designated by special shading, as at 31, in Fig. 6 and by dotted lines in Fig. 1. It will be understood that localized heating, as by a flame, followed by a rapid quench may produce hardened areas which may adequately serve to receive the abutment by a stop member 28.

In order that abutment areas such as the area 31 may properly locate limiting cross-slide feed positions to compensate for spindle-center inaccuracies, these areas 31 may be specially honed, ground, or otherwise calibrated in the process of building the machine. It will be understood then that the abutment area 31 may provide a calibrated limiting feed abutment for properly locating the tool supported by tool holder 19 in its cooperation with the spindle 10. For the next indexed position of the spindle carrier 16, that is, say, when the work in spindle 11 is in position to be formed by cross-slide 18, the stop member 28 will be limited not by the abutment area 31 but by the abutment area 32, which will have been specially honed to provide the proper calibration to compensate for possible inaccuracies in the location of the center of spindle 11. In cooperating with the remaining spindles, the limiting feed of tool holder 19 will be understood to be determined in each instance by a specially calibrated abutment.

It will also be understood that just as all feed positions of the tool holder 19 may be properly limited, so may the feed positions of all other forming-tool holders 33, 34, etc. be appropriately limited. For the arrangement shown, therefore, as many as 12 calibrated abutment areas on spindle 16 may be necessary.

In the described manner, assurance may be had that under no circumstances will cuts be deeper than those for which the tool holders are adjusted. It may be, however, that in thus assuring a limiting advance of the tool holder 19, the stop member 28 or the pin 27 or other parts may be overstressed. To prevent such overstressing, I have provided safety-relief means which may be employed independently with each of the cross-slides 18.

Figure 2:
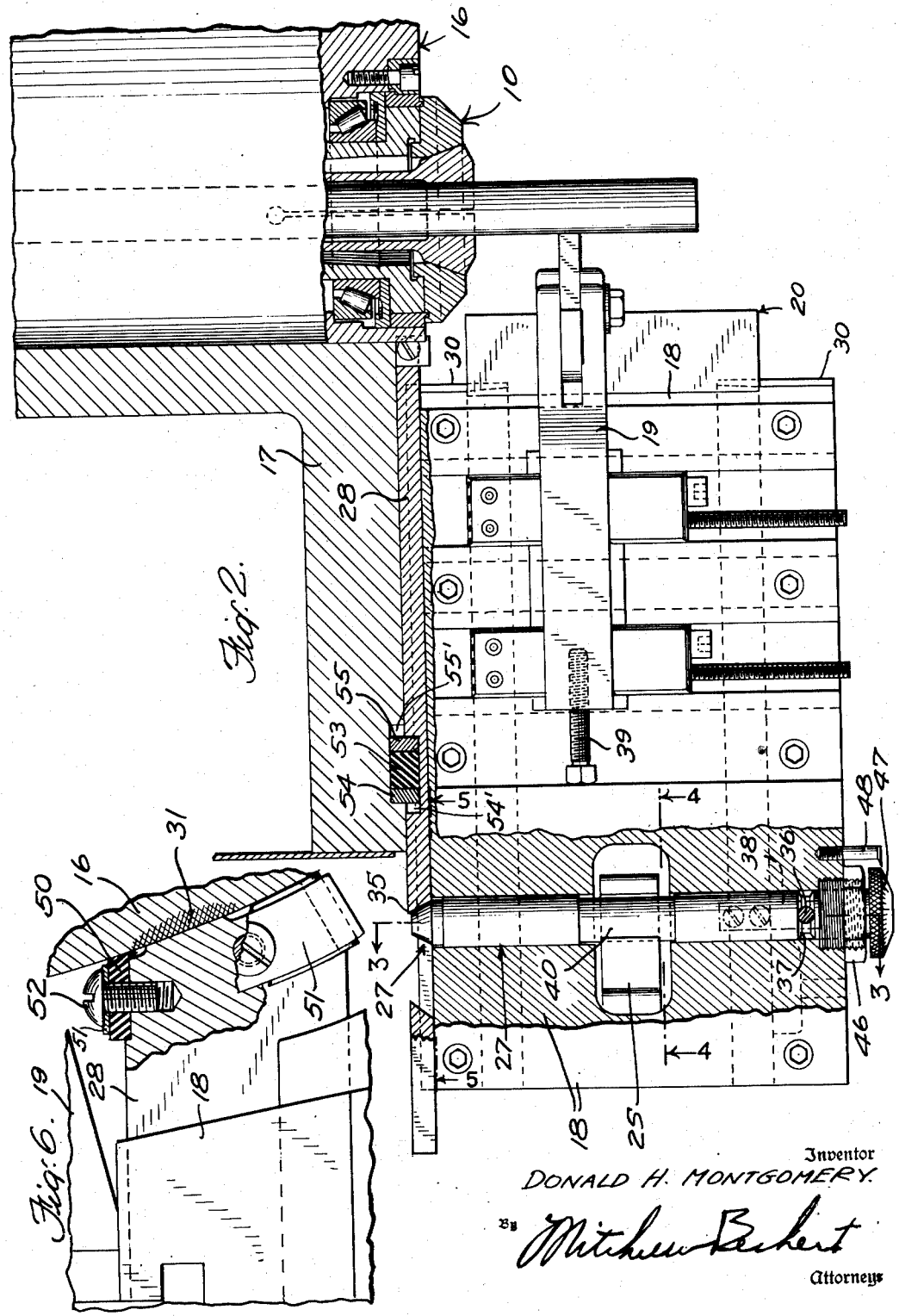
Fig. 2 is an enlarged partially sectionalized plan view taken substantially in the plane 2—2 of Fig. 1.
Figure 3:
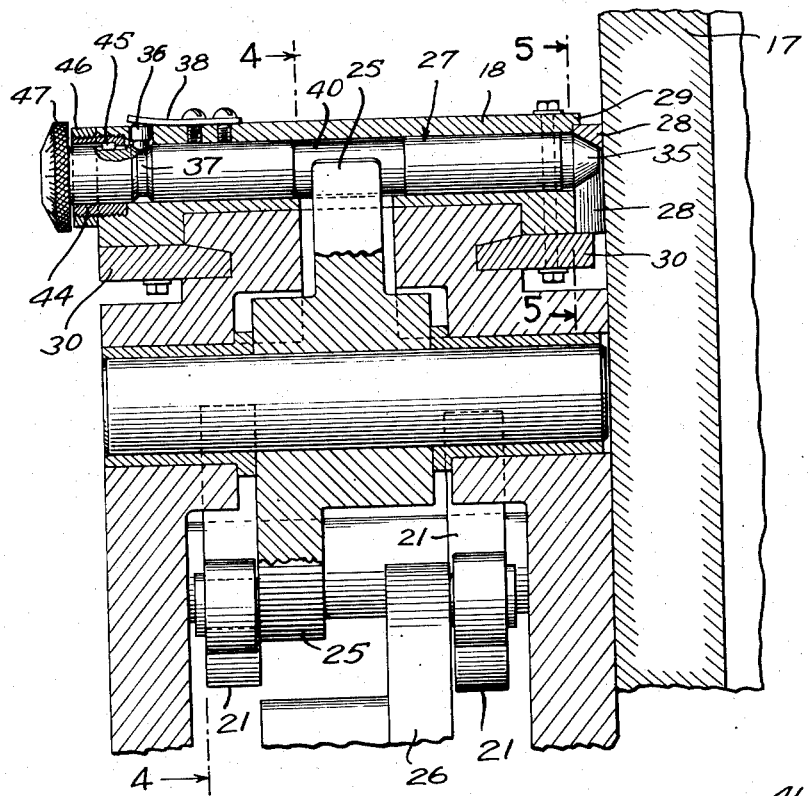
Fig. 3 is a sectional view taken in the plane 3—3 of Fig. 2.
Figure 4:
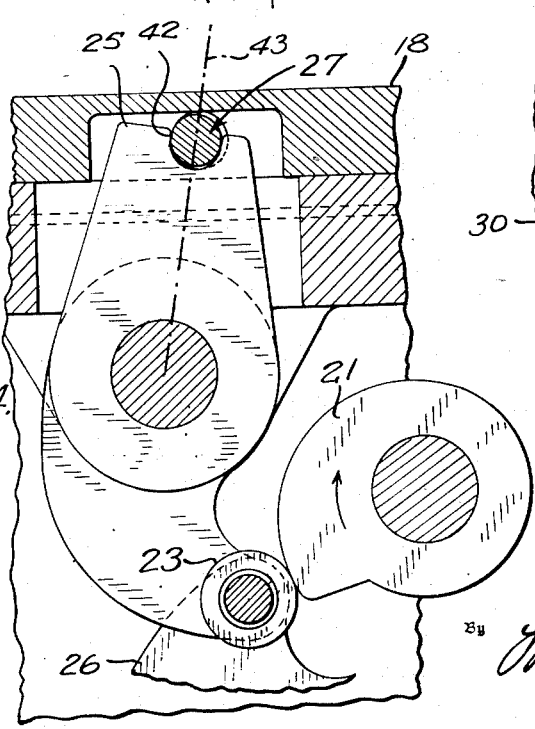
Fig. 4 is a fragmentary sectional view in the plane of 4—4 of Fig. 3.
Figure 5:
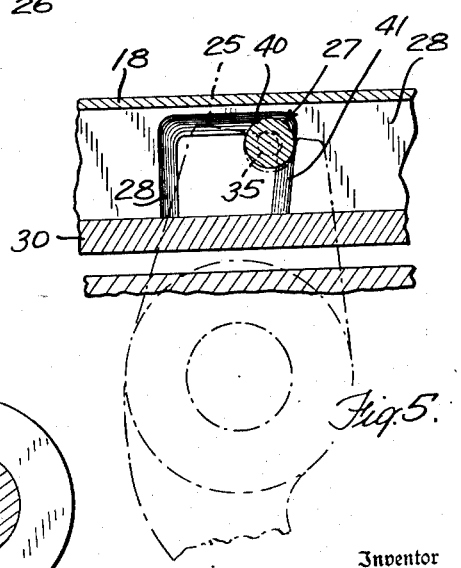
Fig. 5 is another fragmentary sectional view in the plane 5—5 of Fig. 3.

In the form shown in Figs. 2 and 3, the safety-relief mechanism is incorporated into the abutment pin 27, which is engaged by the feed rocker arm 25 and which abuts the stop member 28. To provide for safety relief the portion 35 of pin 27 which abuts the stop member 28 may be formed with a cam surface, so that too great resistance offered by the stop member 28 may result in a retracting axial sliding displacement of pin 27. To resist such retracting displacement a resiliently urged pin 36 may ride in a circumferential groove 37 in pin 27, and there may be a camming engagement between the pin 36 and the walls of the groove 37. A spring finger 38 may serve resiliently to hold the pin 36 within the groove 37. It will be clear that depending upon the steepness of camming engagements between groove 37 and pin 36, and between the pin end 35 and stop member 28, the safety mechanism will yield for various abutment forces on member 28.

In many applications, it is desirable to provide relatively fine positioning adjustment of the cross-slide 18 with respect to the feed rocker arm 25 and with respect to the stop member 28, and it may be desirable to effect such adjustment independently of the cooperative positioning of stop member 28 with respect to feed rocker arm 25. In a coarse sense, such adjustment may be effected by advancing or retracting the tool holder 19 with respect to the cross-slide 18, as by suitable adjustment of a screw 39. However, for fine adjustment I prefer to incorporate an additional feature into the construction of the abutment pin 27.

In the form shown, the above-noted fine adjustment may be effected by forming the pin 27 with an eccentric generally cylindrical surface 40 to engage the feed rocker arm 25 and by forming the cam surface 35 eccentrically. Thus, the cam surface 35 may be frusto-conical about an axis eccentric to the axis of pin 27. Preferably, the eccentricity of surface 20 is of the same sense and throw as that of the surface 35.

It will be recalled that I prefer that the fine adjustment effected by a partial rotation of the abutment pin 27 shall displace the cross-slide 18 without affecting the calibrated cooperation between the feed rocker arm 25 and the stop member 28. To assure such coordination of parts 25—28 for all settings of the eccentric surfaces 35—40, I prefer that the surface 41 on stop member 28 and the surface 42 on the feed rocker arm 25 be inclined with the same slope and that this slope be generally parallel to the inclination of the final feed axis 43 of the actuating arm 25.

In order to hold an adjusted eccentric position for the eccentric surfaces 35—40 on pin 27, suitable locking means may be provided, preferably accessible from the front face of the cross-slide 18. In the form shown, an externally threaded sleeve 44 is keyed to the pin 27 as at 45, and a lock nut 46 threadedly engages the sleeve 44 and may be secured against the forward face of the cross-slide 18. A knurled adjustment knob 47 on the outer end of the pin 27 serves for the angular adjustment of pin 27, and, if desired, an indicator pin 48 may cooperate with suitable markings on the face of knob 47 to indicate the extent of eccentric adjustment of pin 27. It will be clear that by means of extended key slots for the key means 45 full axial freedom may be permitted to the abutment pin 27 so as not to impair its functioning as a safety device in the manner above described.

In accordance with a feature of the invention, I provide means for assuring that my novel abutment mechanism may be effective regardless of the chips or other extraneous matter that may accumulate in the working area. To assure such uniform functioning the forward or projecting end of the stop member 28 may be jacketed as by a sleeve 50 of resilient material, such as neoprene, embracing the end of the stop member 28. The sleeve 50 may be held in place by a peripheral band or strip 51 secured by screws 52. The sleeve 50 preferably projects slightly beyond the abutment end of member 28, and such projection may clearly provide a protective peripherally extending skirt for said end.

In order further to assure that chips or other material may not enter the abutment area, means may normally hold the seal means 50 in contact with the spindle carrier 16. In the form shown, such resilient means is a plug 53 which may be of rubber-like material (e. g. neoprene) cooperating between the frame 17 and the stop member 28 to maintain constant scraping contact of sleeve 50 with the spindle carrier 16. If desired, washers 54—55 may be placed between the resilient element 53 and frame 17 on the one hand and between resilient element 53 and member 28 on the other hand, as by bonding washers 54—55 to the resilient block 53 in a unit sandwich construction. It will be understood that the sandwich 54—53—55 will normally be under a squeezed preload, so as to provide a normal resilient force, reacting between the frame 17 and stop member 28 to urge the latter against spindle carrier 16; the preloaded condition of the sandwich 54—53—55 is suggested by clearances 54'—55' between members 17—28.

It will be clear that the function of resilient means 53 is to assure constant contact of the protective skirt or seal means 50 with the surface of spindle carrier 16. The force exerted by resilient means 53 is, however, preferably not enough of itself to force abutment member 28 into contact with the spindle carrier. The stop member will thus normally be positioned in slight clearance relation with respect to the spindle carrier, even though resilient means 53 urges member 28 toward the spindle carrier. Only when a limiting feed position is to be determined will the feed mechanism be able to force member 28 into abutment with the spindle carrier. Upon indexing, it will be appreciated that the skirt 50 may retain its contact with the spindle carrier, so as to scrape chips and the like away from the next succeeding calibrated abutment area.

In Figs. 7 and 8, I show an alternative preferred form of the invention wherein safety means are again incorporated into the feed-position-limiting mechanism. Again, a transversely extending abutment pin 55 may be journalled, as at 56—57, in a cross-slide 58, and eccentric surfaces 59—60 may serve to receive feed actuation from an arm 61 and to receive limiting abutment from an abutment member 62—similar to the arm 25 and stop member 28 of the first-described embodiment. As distinguished from this first embodiment, the arrangement of Figs. 7 and 8 provides for the shearing of a weak link upon attainment of excessive abutment forces. In the form shown, the weak link is a shear pin 63 carried by the forward end of abutment pin 55, and the shear pin 63 serves normally to engage a sleeve 64 to the abutment pin 55. The sleeve 64 may be a part of the cross-slide 58, or for purposes of greater flexibility of adjustment, the sleeve 64 may be incorporated in an adjustment mechanism. In the adjustable arrangement shown, the sleeve 64 is formed with an enlarged head 65 to be engaged by a further sleeve 66, and the latter sleeve (66) is threadedly engaged to the cross-slide 58. The sleeve 66 may be formed with spanner engaging recesses 67 to provide for axial adjustment of sleeve 66 and, hence, of pin assembly 55.

In order to provide angular adjustment of the abutment pin 55, that is, adjustment of the throw of eccentric surfaces 59—60, an adjustment arm 68 may be pinned or otherwise secured to the forward end of the abutment pin 55. Adjusted angular positions, as determined by the setting of arm 68, may be retained or held by a ratchet mechanism including longitudinally extending ratchet teeth 69 to be engaged by a pawl 70, as resiliently urged by a spring 71. It will be clear that in addition to the function of retaining an angular set of the arm 68 and, hence, of the pin 55, the ratchet means 68—70 may permit a longitudinal sliding of the abutment pin 55, as when the abutment presented by member 62 offers too great resistance. The limit of such resistance is determined by the strength of shear pin 63, and when the pin 63 fails, it will be understood that the abutment-pin assembly 55 may be displaced bodily to the right (in the sense of Fig. 8)—i. e. in the direction of lessening engagement with the abutment member 62.

The temptation may be great, after an unexpected failure of pin 63, to take up the spanner means 67 so as to force the head 65 of sleeve 64 into abutting relation with the journal 57 of pin 55. Such adjustment of the spanner means 67 would clearly defeat the purpose of using a shear pin 63, so that there would no longer be any safety relief provision. To anticipate such careless adjustment of the sleeves 66—64, as when no shearing pin 63 is inserted, the sleeve 66 may be formed with an annular groove 72 to be engaged with lost motion by an abutment in the form of a screw 73. It will be clear that the groove 72 may be formed with limiting walls which may receive the take-up forces of careless spanner adjustment on sleeve 66, before the sleeve 64 is caused to abut the journal 57 of pin 55.

It will be clear that I have described ingenious mechanisms for automatically assuring calibrated limiting feed positions for one or for a plurality of cross-slides, as for use on a multiple-spindle machine. My feed-position-limiting means correctively anticipates inaccuracies in spindle location and at the same time allows for errors which would otherwise result from temperature expansion of materials. Safety means are provided to assure longer life for my position limiting means and to assure greater uniformity of product. The invention is such that it may be applied with relative ease to existing machines.

While I have described my invention in detail for the preferred forms shown, it will be understood that modifications may be made within the scope of the invention as defined in the appended claims.

I claim:

1. In a machine of the character indicated, indexible means, a slide for cooperation with work at successive stations of said indexible means, cam-actuated means for actuating said slide, adjustable means between said cam-actuated means and said slide, and stop means engageable with said adjustable means and including a portion to abut said indexible means, whereby upon abutment of said indexible means by said stop means a limiting feed position may be determined for said slide in accordance with the adjustment of said adjustable means, without disturbing the relationship between said cam-actuated means and said stop means.

2. As an article of manufacture, a cross-slide including a transversely extending pin with eccentric means to receive feed actuation for said cross-slide, whereby upon angular adjustment of said pin there may be a corresponding adjustment between a feed means and said cross-slide, said pin including an eccentric abutment portion to be limited by a relatively fixed abutment, whereby an angular adjustment of said eccentric means may also effect an adjustment of the limiting feed position of said cross-slide.

3. As an article of manufacture, a cross-slide including a pin journalled on an axis generally transversely of the sliding axis of said cross-slide, an eccentric generally cylindrical surface on said pin to engage a feed-actuating member for said cross-slide an eccentric generally conical surface on said pin to engage a position-limiting abutment.

4. As an article of manufacture, a cross-slide including a pin journalled in the body of said cross-slide, and eccentric means on said pin to be engaged by a cross-slide feed actuator and to engage a feed-position-limiting stop, the part of said eccentric means which is to engage said stop being generally conical about an axis offset from the axis of said pin, adjustable means for angularly positioning said pin with respect to the body of said cross-slide, said pin being axially slidable with respect to said adjustable means, and resilient means engaging said pin to resist such axial sliding motion, whereby said resilient means may yieldably protect said pin ad said stop member.

5. In a machine of the character indicated, a cross-slide to be slidably mounted generally transversely of an indexible means, a generally transversely slidable stop member for abutment with the indexible means, seal means carried by said stop member and peripherally skirting the abutment end of said member and extending for engagement with the indexible means when the abutment end of said member is relieved from the indexible means, means on said cross-slide to engage said stop member, and means resiliently urging said seal means toward the indexible means for constant contact with the indexible means.

6. In a machine of the character indicated, a frame, indexible means supported in said frame, a slide having a sliding action generally toward said indexible means, a movable stop member supported between said frame and said slide for abutment with said indexible means, means on said slide to engage said stop member, and resilient means between said frame and said stop member urging said stop member for contact with said indexible means, whereby said stop member may be resiliently maintained in contact with said indexible means regardless of the feed cycle of said slide.

7. As an article of manufacture, a cross-slide for a machine of the character indicated, said cross-slide including a displaceable stop member to be limited by an abutment with a spindle carrier, and yieldable abutment means carried by said cross-slide and yieldably limiting said stop member with respect to said cross-slide, whereby upon too great stressing of said stop member said yieldable means may yield to avoid possible destructive binding between said cross-slide and said stop member.

8. In a cross-slide for a machine of the character indicated, a displaceable stop member to be limited by an abutment with a spindle carrier, said stop member being displaceable in substantially the same predominant direction as the direction of movement of said cross-slide, a transversely movable member carried by said cross-slide and including a cam coacting with said stop member, and a shearable connection between said transversely movable member and said cross-slide, whereby upon an overstressing of said stop member said shearable connection may fail and thus permit a harmless sliding of said stop member and said cross-slide relatively to each other.

9. As an article of manufacture, a cross-slide including a transversely extending abutment pin having a camming portion to engage stop means, a sleeve slidable with respect to said pin, a shearable connection between said sleeve and said abutment pin, and means for adjustably positioning said sleeve with respect to said cross-slide.

10. In a machine of the character indicated, a spindle carrier having a continuous circumferentially extending surface, a plurality of spindles in said spindle carrier, cross-slide means including a part aligned to abut said surface, said part being movably guided generally transversely of said carrier and independently of cross-slide movement, means continuously urging said part toward said spindle carrier, and a locally hardened abutment area on said surface adjacent one of said spindles to receive abutment by said part of the cross-slide, whereby a calibrated limiting feed position may be determined for a tool carried by the cross-slide for particular cooperation with said one spindle.

11. As an article of manufacture, a cross-slide including a pin journalled in the body of said cross-slide, a generally conically formed portion on said pin for transverse limiting abutment with a stop, said pin being axially slidable, and means for resisting axial movement of said pin, whereby an excessive engagement of said pin with the abutment may produce an axial displacement of said pin, thereby relieving the cooperating parts from excessive strain.

12. As an article of manufacture, a cross-slide having means for guiding the same in a predominant direction of movement and including an axially slidable pin guided in the body of said cross-slide and generally transverse to said predominant direction, a generally conically formed portion on said pin for transverse limiting abutment with a stop, and means yieldably cooperating between said pin and the body of said cross-slide to yieldably resist axial displacement of said pin.

DONALD H. MONTGOMERY.

References Cited in the file of this patent

UNITED STATES PATENTS

| Number | Name | Date |
| --- | --- | --- |
| 1,069,750 | Williams et al. | Aug. 12, 1913 |
| 1,224,714 | Cone | May 1, 1917 |
| 1,604,204 | Tessky | Oct. 26, 1926 |
| 1,709,118 | Class | Apr. 16, 1929 |
| 1,729,863 | Biewend et al. | Oct. 1, 1929 |
| 1,869,114 | Phelps | July 26, 1932 |
| 2,001,586 | Rupple | May 14, 1935 |
| 2,142,557 | Cone | Jan. 3, 1939 |
| 2,325,571 | Montgomery | July 27, 1943 |
| 2,404,210 | Bechler | July 16, 1946 |